(12) United States Patent
Westwater

(10) Patent No.: US 10,070,149 B2
(45) Date of Patent: Sep. 4, 2018

(54) METHOD AND APPARATUS TO PERFORM OPTIMAL VISUALLY-WEIGHED QUANTIZATION OF TIME-VARYING VISUAL SEQUENCES IN TRANSFORM SPACE

(71) Applicant: ZPEG, Inc., Austin, TX (US)

(72) Inventor: Raymond John Westwater, Austin, TX (US)

(73) Assignee: ZPEG, Inc., Austin, TX (US)

( * ) Notice: Subject to any disclaimer, the term of this patent is extended or adjusted under 35 U.S.C. 154(b) by 0 days.

(21) Appl. No.: 15/189,187

(22) Filed: Jun. 22, 2016

(65) Prior Publication Data

US 2016/0309189 A1    Oct. 20, 2016

Related U.S. Application Data

(63) Continuation of application No. 14/266,757, filed on Apr. 30, 2014.

(Continued)

(51) Int. Cl.
| | |
|---|---|
| *H04N 19/625* | (2014.01) |
| *H04N 19/124* | (2014.01) |
| *H04N 19/176* | (2014.01) |
| *H04N 19/91* | (2014.01) |
| *H04N 19/129* | (2014.01) |
| *H04N 19/14* | (2014.01) |
| *H04N 19/18* | (2014.01) |
| *H04N 19/182* | (2014.01) |
| *H04N 19/63* | (2014.01) |

(52) U.S. Cl.
CPC ......... *H04N 19/625* (2014.11); *H04N 19/124* (2014.11); *H04N 19/129* (2014.11); *H04N 19/14* (2014.11); *H04N 19/176* (2014.11); *H04N 19/18* (2014.11); *H04N 19/182* (2014.11); *H04N 19/63* (2014.11); *H04N 19/91* (2014.11)

(58) Field of Classification Search
CPC ...... H04N 19/63; H04N 19/124; H04N 19/18; H04N 19/60; H04N 19/122; H04N 19/126; H04N 19/13; H04N 19/136; H04N 19/14; H04N 19/1883; H04N 19/91; H04N 19/176; H04N 19/62; H03M 7/40; H03M 7/4006
USPC ........................................ 375/240.01–240.29
See application file for complete search history.

(56) References Cited

U.S. PATENT DOCUMENTS

| | | |
|---|---|---|
| 4,780,762 A | 10/1988 | Nagasaki |
| 4,894,713 A | 6/1990 | Delogne et al. |

(Continued)

OTHER PUBLICATIONS

Nadenau et al., "Wavelet-Based Color Image Compression: Exploiting the Contrast Sensitivity Function," IEEE Trans. Image Processing vol. 12, No. 1, Jan. 2003, pp. 58-70.*

(Continued)

*Primary Examiner* — Nathnael Aynalem
(74) *Attorney, Agent, or Firm* — Lee & Hayes, PLLC

(57) ABSTRACT

The use of the three-dimensional DCT as a key compression technology requires development of an entirely new quantizing mechanism. The embodiment described herein uses a Human Visual Model to develop quantizers based on a combination of descriptive characteristics of the video source, enabling independent derivation of said quantizers in both encoder and decoder sides of the compression and playback process.

30 Claims, 17 Drawing Sheets

Related U.S. Application Data

(60) Provisional application No. 61/818,419, filed on May 1, 2013.

(56) References Cited

U.S. PATENT DOCUMENTS

| | | |
|---|---|---|
| 5,629,780 A | 5/1997 | Watson |
| 5,737,020 A | 4/1998 | Hall et al. |
| 5,751,358 A | 5/1998 | Suzuki et al. |
| 5,768,534 A | 6/1998 | Guillote et al. |
| 5,933,193 A | 8/1999 | Niesen |
| 5,936,669 A | 8/1999 | Niesen |
| 5,953,460 A | 9/1999 | Wu |
| 6,023,531 A | 2/2000 | Peters |
| 6,222,887 B1 | 4/2001 | Nishikawa et al. |
| 6,239,811 B1 | 5/2001 | Westwater |
| 6,252,989 B1* | 6/2001 | Geisler ............ H04N 19/176 345/555 |
| 6,256,413 B1 | 7/2001 | Hirabayashi |
| 6,314,208 B1 | 11/2001 | Konstantinides |
| 6,347,157 B2 | 2/2002 | Chui |
| 6,456,744 B1 | 9/2002 | Lafe |
| 6,801,573 B2 | 10/2004 | Zheng |
| 6,894,628 B2 | 5/2005 | Marpe et al. |
| 6,990,247 B2 | 1/2006 | Schwartz |
| 7,006,568 B1* | 2/2006 | Gu .................. H04N 19/46 348/472 |
| 7,076,104 B1 | 7/2006 | Keith et al. |
| 7,123,656 B1 | 10/2006 | Reznik |
| 7,599,840 B2 | 10/2009 | Mehrotra et al. |
| 7,634,145 B2 | 12/2009 | Keith et al. |
| 7,684,981 B2 | 3/2010 | Thumpudi et al. |
| 7,889,790 B2 | 2/2011 | Sun |
| 8,179,974 B2 | 5/2012 | Tu et al. |
| 8,236,068 B2 | 8/2012 | Aramata et al. |
| 8,306,340 B2 | 11/2012 | Ceperkovic et al. |
| 8,326,067 B2 | 12/2012 | Furbeck |
| 8,351,500 B2 | 1/2013 | Shimofure |
| 8,432,967 B2 | 4/2013 | Hosaka et al. |
| 8,436,755 B2 | 5/2013 | Korodi et al. |
| 2001/0004400 A1 | 6/2001 | Aoki et al. |
| 2002/0168022 A1 | 11/2002 | Kim |
| 2002/0186772 A1 | 12/2002 | Li et al. |
| 2003/0090591 A1 | 5/2003 | Concion et al. |
| 2003/0112333 A1* | 6/2003 | Chen ................ H04N 17/004 348/192 |
| 2003/0142098 A1 | 7/2003 | Kim et al. |
| 2003/0169928 A1 | 9/2003 | Stanek |
| 2003/0190086 A1* | 10/2003 | Kim .................. G06T 5/002 382/275 |
| 2004/0001611 A1 | 1/2004 | Celik et al. |
| 2004/0061709 A1 | 4/2004 | Park et al. |
| 2004/0062448 A1* | 4/2004 | Zeng ................ H04N 19/63 382/251 |
| 2004/0066974 A1 | 4/2004 | Karczewicz et al. |
| 2004/0105590 A1 | 6/2004 | Akimoto et al. |
| 2004/0151243 A1* | 8/2004 | Bhaskaran .......... H04N 19/176 375/240.03 |
| 2004/0190610 A1 | 9/2004 | Song et al. |
| 2004/0208362 A1 | 10/2004 | Suzuki |
| 2005/0008224 A1 | 1/2005 | Caruso et al. |
| 2005/0105608 A1 | 5/2005 | Coleman et al. |
| 2005/0157791 A1* | 7/2005 | Sun ................ H04N 19/196 375/240.16 |
| 2005/0165517 A1 | 7/2005 | Reich |
| 2005/0190836 A1* | 9/2005 | Lu .................... H04N 19/176 375/240.03 |
| 2005/0207660 A1 | 9/2005 | Edgar |
| 2005/0281479 A1 | 12/2005 | Song |
| 2005/0286629 A1 | 12/2005 | Dumitras et al. |
| 2006/0062304 A1 | 3/2006 | Hsia |
| 2006/0098897 A1 | 5/2006 | Dewaele |
| 2006/0155531 A1 | 7/2006 | Miller |
| 2006/0164268 A1 | 7/2006 | Lee et al. |
| 2006/0165311 A1* | 7/2006 | Watson ............ G06T 7/0002 382/286 |
| 2006/0292837 A1 | 12/2006 | Gomila et al. |
| 2007/0018906 A1 | 1/2007 | Visnovsky et al. |
| 2007/0071090 A1 | 3/2007 | Peng et al. |
| 2007/0081589 A1 | 4/2007 | Kim et al. |
| 2007/0121731 A1 | 5/2007 | Tanizawa et al. |
| 2007/0195737 A1* | 8/2007 | Walker .............. H04H 20/26 370/335 |
| 2007/0230565 A1 | 10/2007 | Tourapis et al. |
| 2007/0263938 A1* | 11/2007 | Lee .................. H04N 19/14 382/240 |
| 2007/0273939 A1 | 11/2007 | Kishida et al. |
| 2008/0071764 A1 | 3/2008 | Omi et al. |
| 2008/0186348 A1 | 8/2008 | Yanai et al. |
| 2008/0192824 A1 | 8/2008 | Lim et al. |
| 2008/0298636 A1 | 12/2008 | Rasheed et al. |
| 2009/0092099 A1* | 4/2009 | Gu .................... H04L 12/66 370/331 |
| 2009/0232408 A1* | 9/2009 | Meany ................ H03M 7/40 382/246 |
| 2010/0054342 A1 | 3/2010 | Jang et al. |
| 2010/0286991 A1 | 11/2010 | Hedelin et al. |
| 2010/0322597 A1 | 12/2010 | Gharavi-Alkhansari et al. |
| 2010/0324850 A1 | 12/2010 | Jung et al. |
| 2010/0329329 A1 | 12/2010 | Reznik et al. |
| 2011/0075897 A1 | 3/2011 | Dekel et al. |
| 2011/0255589 A1* | 10/2011 | Saunders ............ H04N 19/176 375/240.01 |
| 2011/0268182 A1* | 11/2011 | Joshi .................. H04N 19/647 375/240.03 |
| 2011/0286525 A1 | 11/2011 | Kamisli et al. |
| 2012/0057629 A1* | 3/2012 | Shi .................... H04N 19/52 375/240.03 |
| 2012/0133361 A1 | 5/2012 | Gross |
| 2012/0140819 A1 | 6/2012 | Kim et al. |
| 2013/0003829 A1 | 1/2013 | Misra et al. |
| 2013/0089137 A1 | 4/2013 | Korman et al. |
| 2013/0114703 A1 | 5/2013 | DeForest et al. |
| 2013/0195206 A1 | 8/2013 | McCarthy |
| 2013/0287104 A1 | 10/2013 | Jeong et al. |
| 2013/0336594 A1 | 12/2013 | Dorairaj |
| 2014/0003728 A1 | 1/2014 | Aoki et al. |
| 2014/0051108 A1 | 2/2014 | Bernardi et al. |
| 2014/0115472 A1 | 4/2014 | Mochinaga et al. |
| 2014/0169407 A1 | 6/2014 | Terry |
| 2014/0267432 A1 | 9/2014 | Dong et al. |
| 2014/0270331 A1 | 9/2014 | Zhao et al. |
| 2014/0286434 A1 | 9/2014 | Lee et al. |
| 2014/0327737 A1 | 11/2014 | Westwater |
| 2014/0328406 A1 | 11/2014 | Westwater |
| 2014/0376620 A1 | 12/2014 | Kondo |
| 2015/0003707 A1 | 1/2015 | Amon et al. |
| 2016/0309189 A1 | 10/2016 | Westwater |
| 2016/0309190 A1 | 10/2016 | Westwater |

OTHER PUBLICATIONS

Nadenau, "Wavelet-Based Color Image Compression: Exploiting the Contrast Sensitivity Function", IEEE Transactions on Image Porcessing, vol. 12, No. 1, Jan. 2003, pp. 58-70.

Office action for U.S. Appl. No. 15/189,242, dated Nov. 23, 2016, Westwater, "Method and Apparatus to Perform Correlation-Based Entropy Removal From Quantized Still Images or Quantized Time-Varying Video Sequences in Transform", 46 pages.

Office action for U.S. Appl. No. 14/266,757, dated Sep. 1 2016, Westwater, "Method and Apparatus to Perform Optimal Visually-Weighed Quantization of Time-Varying Visual Sequences in Transform Space", 20 pages.

Office action for U.S. Appl. No. 14/266,645, dated Sep. 28, 2016, Westwater, "Method and Apparatus to Perform Correlation-Based Entropy Removal from Quantized Still Images or Quantized Time-Varying Video Sequences in Transform", 30 pages.

Office action for U.S. Appl. No. 15/189,187, dated Sep. 8, 2016, Westwater, "Method and Apparatus to Perform Optimal Visually-

(56) References Cited

OTHER PUBLICATIONS

Weighed Quantization of Time-Varying Visual Sequences in Transform Space", 20 pages.

* cited by examiner $$CSF(u,w,I,X_0,X_{max}) = \overbrace{\cfrac{M_{opt}(u,I,X_0)/k}{\sqrt{\frac{2}{T} * \left(\frac{1}{X_0^2} + \frac{1}{X_{max}^2} + \frac{u^2}{N_{max}^2}\right) * \sqrt{\left(\frac{1}{\eta * p * E(L,X_0)} + \frac{\phi_0}{[H_1(w,L,X_0) * (1 - H_2(w,L,X_0) * F(u))]^2}\right)}}}}^{7010}$$

where $$M_{opt}(u,I,X_0) = -2 * \pi * \sigma(I,X_0)^2 * u^2$$

$$\sigma(I,X_0) = \sqrt{\sigma_0^2 + (C_{ab} * d(I,X_0))^2}$$

$$d(I,X_0) = 5 - \tanh(.4 * \ln(I * X_0^2/40^2))$$

$$E(I,X_0) = L * \pi * (d(I,X_0)/2)^2$$

$$H_1(w,I,X_0) = \cfrac{1}{[1 + (2 * \pi * w * t_1(I,X_0))^2]^{3.5}}$$

$$t_1(I,X_0) = \cfrac{.001 * t_{10}}{(1 + 0.55 * \ln(1 + (1 + X_0)^{.6} * E(I,X_0)/3.5))}$$

$$H_2(w,I,X_0) = \cfrac{1}{[1 + (2 * \pi * w * t_2(I,X_0))^2]^2}$$

$$t_2(I,X_0) = \cfrac{.001 * t_{20}}{(1 + 0.55 * \ln(1 + (1 + X_0)^5 * E(I,X_0)/120))}$$

Empirically measured constants K=3, T=100ms, $N_{max}$=15, η=03, p=1.0 x $10^6$, $\Phi_0$=3 x $10^{-8}$, $\sigma_0$=.5, $C_{ab}$=.08, $t_{10}$=32, $t_{20}$=18, $u_0$=7,

7020 And variables

- 7030 u, 2-D weighted spatial frequency in cycles / second.
- w, temporal frequency in cycles / second.
- 7040 I, average luminance in cd/$m^2$. While normal TV luminance is around 62, the value 2 results in good agreement with JPEG quantizer values.
- 7050 $X_0$, angle in degrees subtended by the DCT block
- 7060 $X_{max}$, angle in degrees subtended by the television surface

FIG. 7

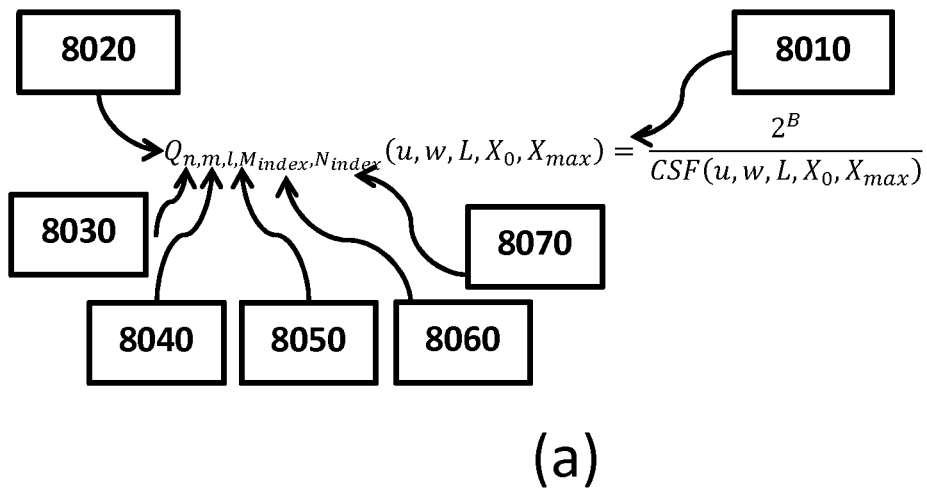
(a)
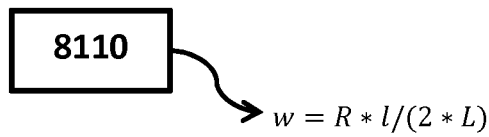
where
l = DCT component index in temporal direction
L = DCT resolution in temporal direction
(b)
FIG. 8

9010 → $X_{max} = \sqrt{X_H^2 + X_V^2}$ where $$X_V = 2 * \arctan\left(\frac{.5}{D}\right)$$

$$X_H = 2 * \arctan\left(\frac{.5 * Aspect}{D}\right)$$

And D is the viewing distance in screen heights (a)

9020 → $X_0 = \sqrt{X_{0H}^2 + X_{0V}^2}$ where $$X_{OV} = \frac{M * X_V}{V}$$

$$X_{OH} = \frac{N * X_H}{H}$$

M is DCT resolution in vertical direction, and N is DCT resolution in horizontal direction (b)

FIG. 9

10010 → $$u = \frac{\sqrt{f_H^2 + f_V^2}}{r}$$

where $$f_{0H} = \frac{N}{X_H}$$

$$f_H = f_{0H} * n/(2*N)$$

$$f_{0V} = \frac{M}{X_V}$$

$$f_V = f_{0V} * m/(2*M)$$

$$r = r_\theta * r_e$$

10020 →
$$r_\theta = \left(\frac{1-.78}{2}\right)\left(1 - 8\frac{f_H^2}{f_H^2 + f_V^2}\frac{f_V^2}{f_H^2 + f_V^2}\right) + \left(\frac{1+.78}{2}\right)$$

10030 → $$r_e = \frac{1}{1+.24e}$$

$$e = \arctan\left(\frac{\sqrt{\left(N_{index} * N/H - .5\right)^2 + Aspect^2 * \left(M_{index} * M/V - .5\right)^2}}{D}\right)$$

m = DCT component index in vertical direction
n = DCT component index in horizontal direction
$M_{index}$ = DCT block number in vertical direction
$N_{index}$ = DCT block number in horizontal direction

FIG. 10

15010 → $Q_{0,0,0} = \sqrt{L * M * N}$ (a)

15110

```
int calcQ(int l, int m, int n)
{
    Q = 1;
    if (l==0)
        Q*=sqrt(L);
    if (m==0)
        Q*=sqrt(M);
    if (n==0)
        Q*=sqrt(N);
    return Q;
}
```

15210
15220 → $Q_{DCm,n,0} = calcQ(0, m, n)$

→ $Q_{ACm,n,0} = \dfrac{2^B}{CSF(u, w, 0, X_0, X_{max})}$ (b)

FIG. 15

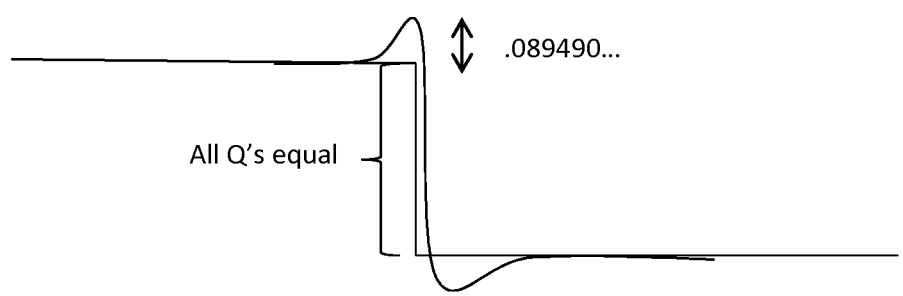
(a)
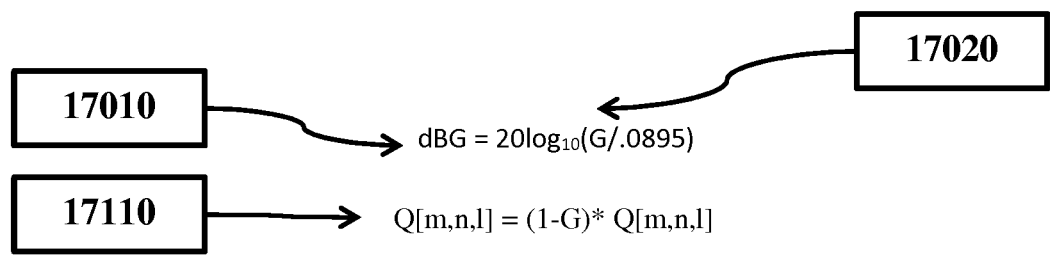
(b)
FIG. 17

METHOD AND APPARATUS TO PERFORM OPTIMAL VISUALLY-WEIGHED QUANTIZATION OF TIME-VARYING VISUAL SEQUENCES IN TRANSFORM SPACE

CROSS-REFERENCE TO RELATED APPLICATION(S)

This application is a continuation of U.S. application Ser. No. 14/266,757, filed on Apr. 30, 2014, which is a non-provisional and claims benefit of a U.S. Provisional Application No. 61/818,419, filed on May 1, 2013.

BACKGROUND

The present invention relates generally to compression of moving video data, and more particularly to the application of quantization of the three-dimensional Discrete Cosine Transform (DCT) representation of moving video data for the purposes of removing visually redundant information.

SUMMARY

In accordance with one aspect of the invention, a method is provided for removal of all subjectively redundant visual information by means of calculating optimal visually-weighed quantizers corresponding to the decorrelating-transformed block decomposition of a sequence of video images. The contrast sensitivity of the human eye to the actual time-varying transform-domain frequency of each transform component is calculated, and the resolution of the transformed data is reduced by the calculated sensitivity.

A second aspect of the invention applies specifically to use of the DCT as the decorrelating transform.

BRIEF DESCRIPTION OF THE DRAWINGS

FIG. 7 defines a typical time-varying contrast sensitivity function.

FIG. 8 defines a visually optimal quantizer in terms of visual resolution and the contrast sensitivity function specified in FIG. 7.

FIG. 9 refines the visually optimal quantizer definition of FIG. 8 with angular data specifications.

FIG. 10 refines the visually optimal quantizer definition of FIG. 8 with off-axis visual sensitivity human visual system adjustments.

FIG. 15 illustrates the calculation of DC component quantizers, and the contributed DC and AC quantizers of a mixed DC/AC component.

FIG. 17 illustrates the application of a configurable Gibbs ringing compensation factor.

DETAILED DESCRIPTION

It is well established in the literature of the field of video compression that video can be well-modeled as a stationary Markov-1 process. This statistical model predicts the video behavior quite well, with measured correlations over 0.9 in the pixel and line directions.

It is well-known the Karhunen-Loeve Transform (KLT) perfectly decorrelates Markov-distributed video. This means the basis of the KLT is an independent set of vectors which encode the pixel values of the video sequence.

It is a further result that many discrete transforms well approximate the KLT for large correlation values. Perhaps the best-known such function is the DCT, although many other functions (DST, WHT, etc.) serve as reasonable approximations to the KLT.

Figure 1:
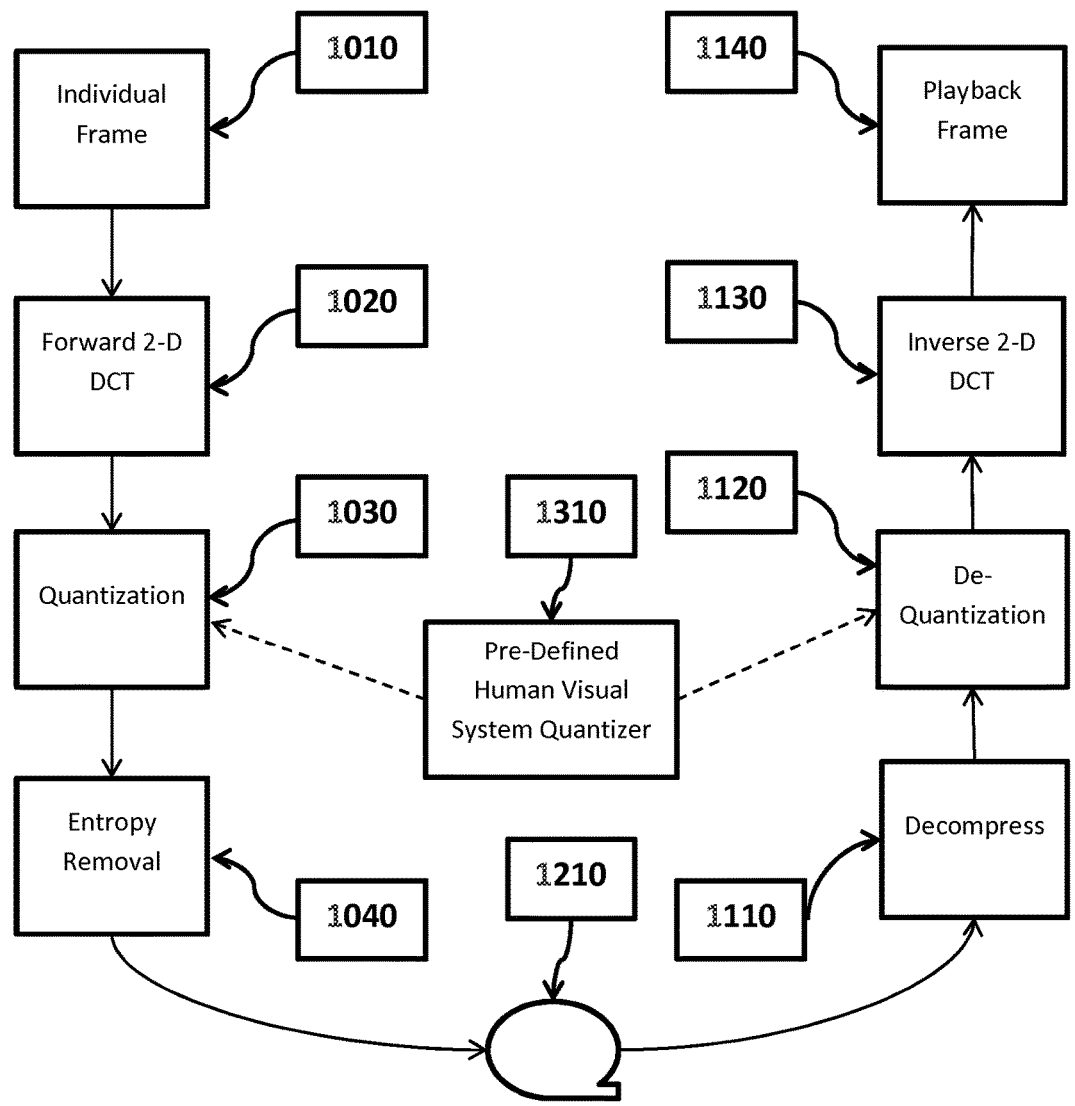
FIG. 1 depicts a prior-art compressor featuring an optimal spatial transform and optimal fixed visual quantizers (JPEG).

It is for this reason the DCT is used to decorrelate images in the JPEG standard, after which a uniform quantization factor individually chosen for each DCT component is applied to said component, removing visual information imperceptible to the human eye. FIG. 1 illustrates the use of a Human Visual System quantizer array in JPEG. An individual frame of digitized video 1010 is transformed via a two-dimensional DCT 1020 and then quantized 1020 to remove imperceptible visual data. An entropy removal process 1040 actually compresses the information. The decompression process follows an equivalent set of steps in reverse, when a data set or data stream containing the compressed data 1210 is decompressed 1110 by reversing said entropy removal process, followed by a de-quantization step 1120, an inverse DCT step 1130, and a resulting frame 1140 may be displayed or otherwise processed. A key part of the process is good choice of quantizers 1310 that leverage a Human Visual Model to optimally remove redundant information. The use of a Human Vision Model in terms of a Contrast Sensitivity Function to generate two-dimensional quantizer coefficients is taught by Hwang, et al, and by Watson U.S. Pat. No. 5,629,780.

Figure 2:
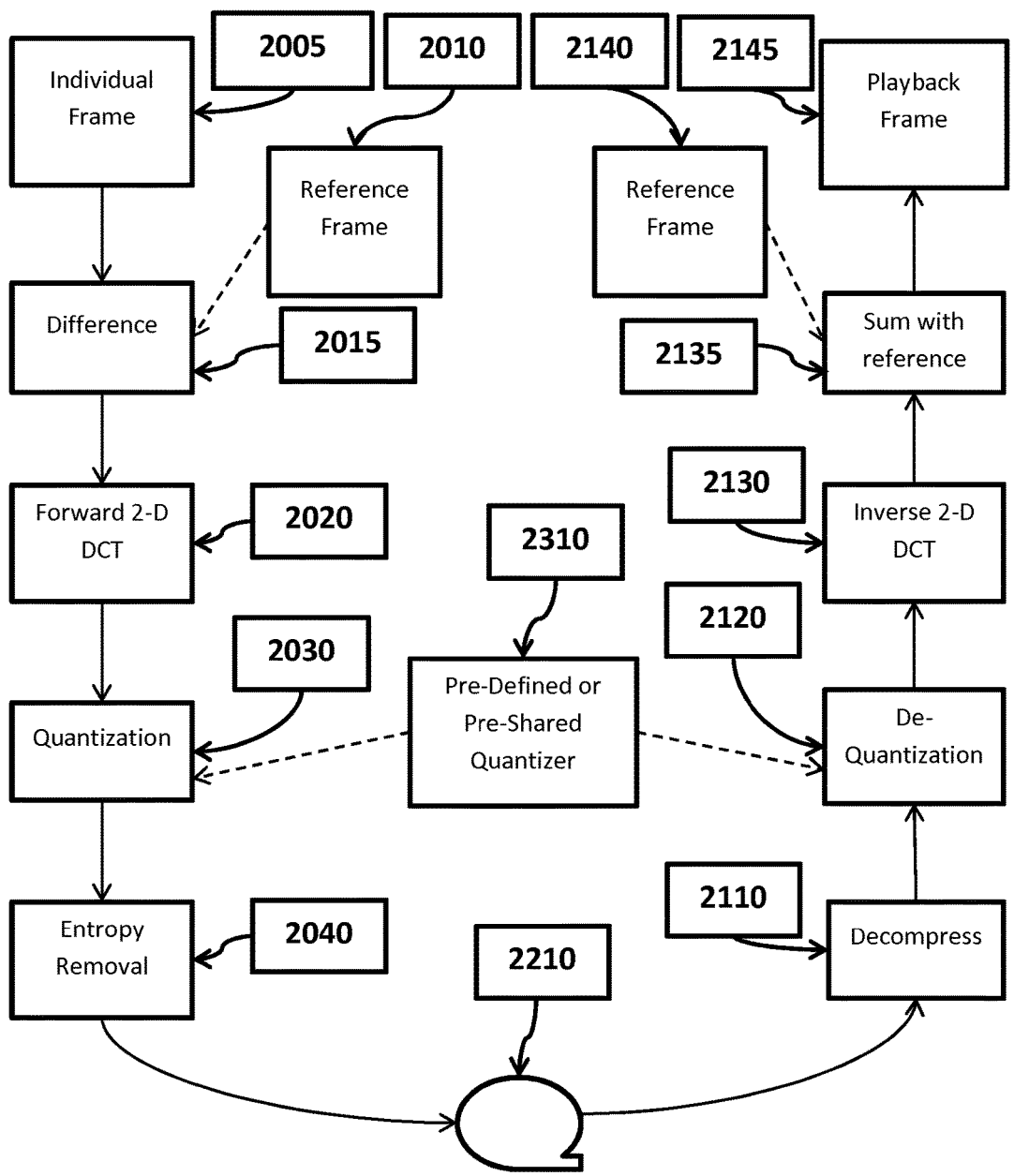
FIG. 2 depicts a prior-art compressor featuring a sub-optimal time-varying transform using sub-optimal quantizers fixed or in-band quantizers (MPEG).

FIG. 2 illustrates the use of the DCT in the prior-art MPEG standard. A block-based difference after motion estimation 2015 is taken between reference frame(s) 2010 and an individual frame to be compressed 2005. Said block-based difference after motion estimation 2015 is transformed using the two-dimensional DCT 2020 and quantized 2030. The resulting quantized data is compressed via an entropy removal process 2040, resulting in a compressed data set or stream 2210. A decompression process can then be executed on said compressed data set or stream 2210, comprising the reverse entropy removal step 2110, a de-quantizing step 2120, an inverse two-dimensional DCT process 2130, and a block-based summation process 2135 using a previously-decompressed reference frame 2140 to generate an individual frame ready for playback or other processing 2145. The pre-defined fixed quantizer 2310 utilized in said quantization process 2030 and said de-quantization process 2130 cannot leverage the Human Vision Model, as no such model has been developed to apply directly to the difference between video blocks.

What is needed is a means of removing subjectively redundant video information from a moving sequence of video.

Figure 3:
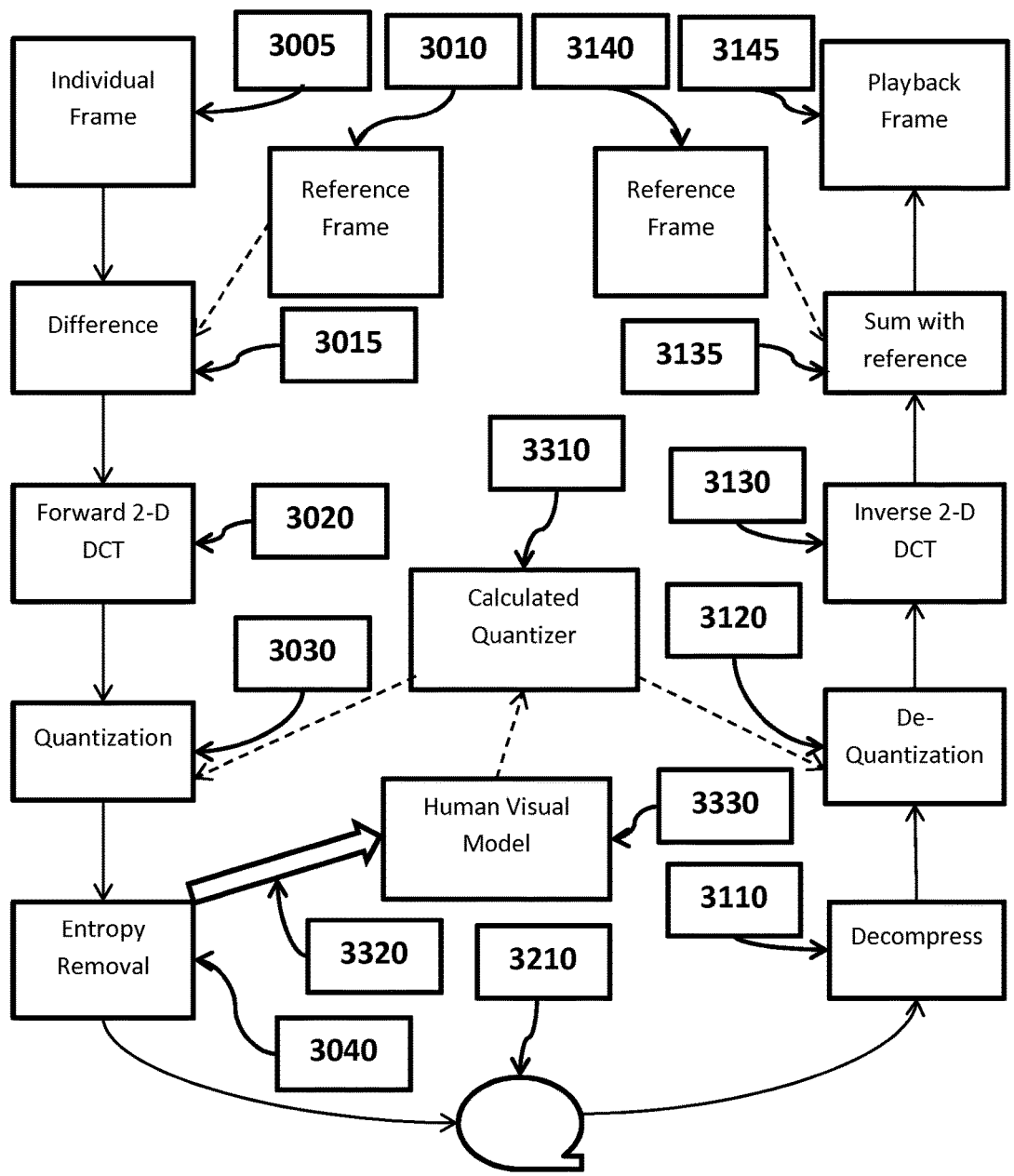
FIG. 3 depicts a prior-art compressor featuring a sub-optimal time-varying transform and a recursive feedback quantizer calculation to generate in-band quantizers.

Many prior-art techniques are taught under the principle of guiding a design of a quantization matrix to provide optimum visual quality for a given bitrate. These techniques, being applicable to motion compensation-based compression algorithms, require a Human Visual Model-driven feedback loop to converge on the quantizers that will show minimal artifact on reconstruction. The use of this Human Visual Model is again limited to its application in the spatial domain. An example of this teaching is U.S. Pat. No. 8,326,067 by Furbeck, as illustrated in FIG. 3. A block-based difference after motion estimation 3015 is taken between reference frame(s) 3010 and an individual frame to be compressed 33005. Said block-based difference after motion estimation 3015 is transformed using the two-dimensional DCT 3020 and quantized 3030. The resulting quantized data is compressed via an entropy removal process 3040, resulting in a compressed data set or stream 3210. A decompression process can then be executed on said compressed data set or stream 3210, comprising the reverse entropy removal step 3110, a de-quantizing step 3120, an inverse two-dimensional DCT process 3130, and a block-based summation process 3135 using a previously-decompressed reference frame 3140 to generate an individual frame ready for playback or other processing 3145. The quantizer 3310 utilized in said quantization process 3030 and said de-quantization process 3130 cannot directly leverage the Human Vision Model, as no such model has been developed to apply directly to the difference between video blocks. Therefore a feedback processing step 3240 communicates to a Human Visual Model 3250 which determines the perceptual error, and feeds back recalculated said quantizers 3310 to be used to re-compress said individual frame to be compressed 3005. Said feedback processing step 3240 may be based on simple perceptual error minimization, or may minimize compression ratio after entropy removal.

Figure 4:
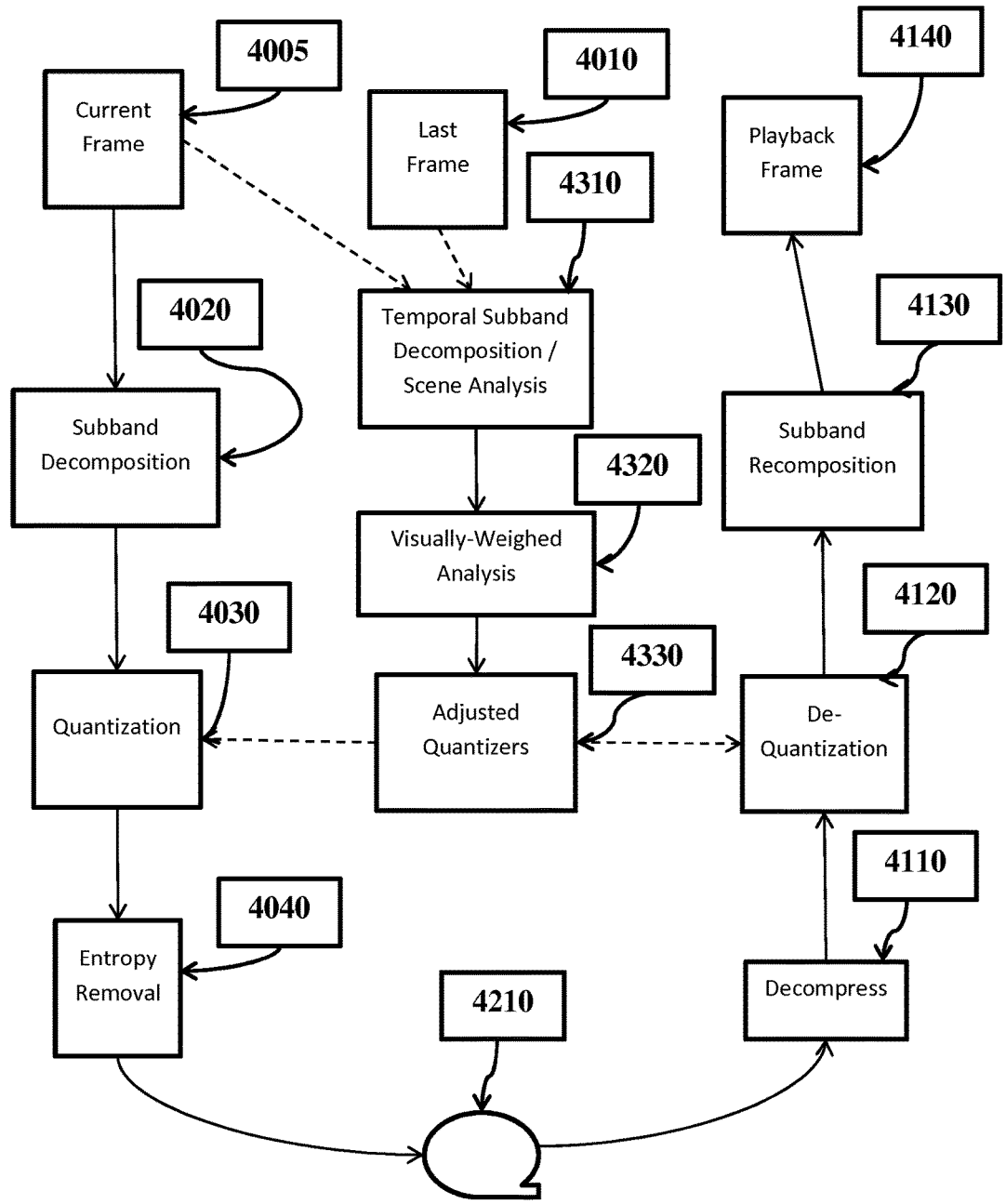
FIG. 4 depicts a prior-art compressor featuring a sub-optimal time-varying transform using sub-optimal quantizers fixed or in-band quantizers (wavelet).

The wavelet transform is another technique commonly used to perform compression. However, the wavelet does not decorrelate video, and thus optimal quantizers based upon a Human Visual Model cannot be calculated. A teaching by Gu et al, U.S. Pat. No. 7,006,568 attempts to address this issue by segmenting video sequences into similar-characteristic segments and calculating 2-D quantizers for each selected segment, chosen to reduce perceptual error in each subband, as illustrated in FIG. 4. A frame to be compressed 4005 is decomposed into its subbands via wavelet decomposition 4020 and quantized 4030. The resulting quantized data is compressed via an entropy removal process 4040, resulting in a compressed data set or stream 4210. A decompression process can then be executed on said compressed data set or stream 4210, comprising the reverse entropy removal step 4110, a de-quantizing step 4120, a subband reconstruction process 4130 to generate an individual frame ready for playback or other processing 4140. The quantizer 4330 utilized in said quantization process 4030 and said de-quantization process 4130 cannot directly leverage the Human Vision Model, as no such model has been developed to apply directly to the poorly-decorrelated video basis of the wavelet decomposition. This prior-art teaching subdivides the video stream into regions of relatively stable visual performance bounded by scene changes, as calculated by a scene analysis process 4310 acting upon said frame to be compressed 4005 and its previous frame in the motion video sequence 4010. A visually-weighted analysis process 4320 then calculates said quantizers 4330.

The current invention improves the compression process by directly calculating the visually optimal quantizers for 3-D transform vectors by evaluating the basis behavior of the decorrelated transform space under a time-varying Human Visual Model, as represented by a Contrast Sensitivity Function.

Figure 5:
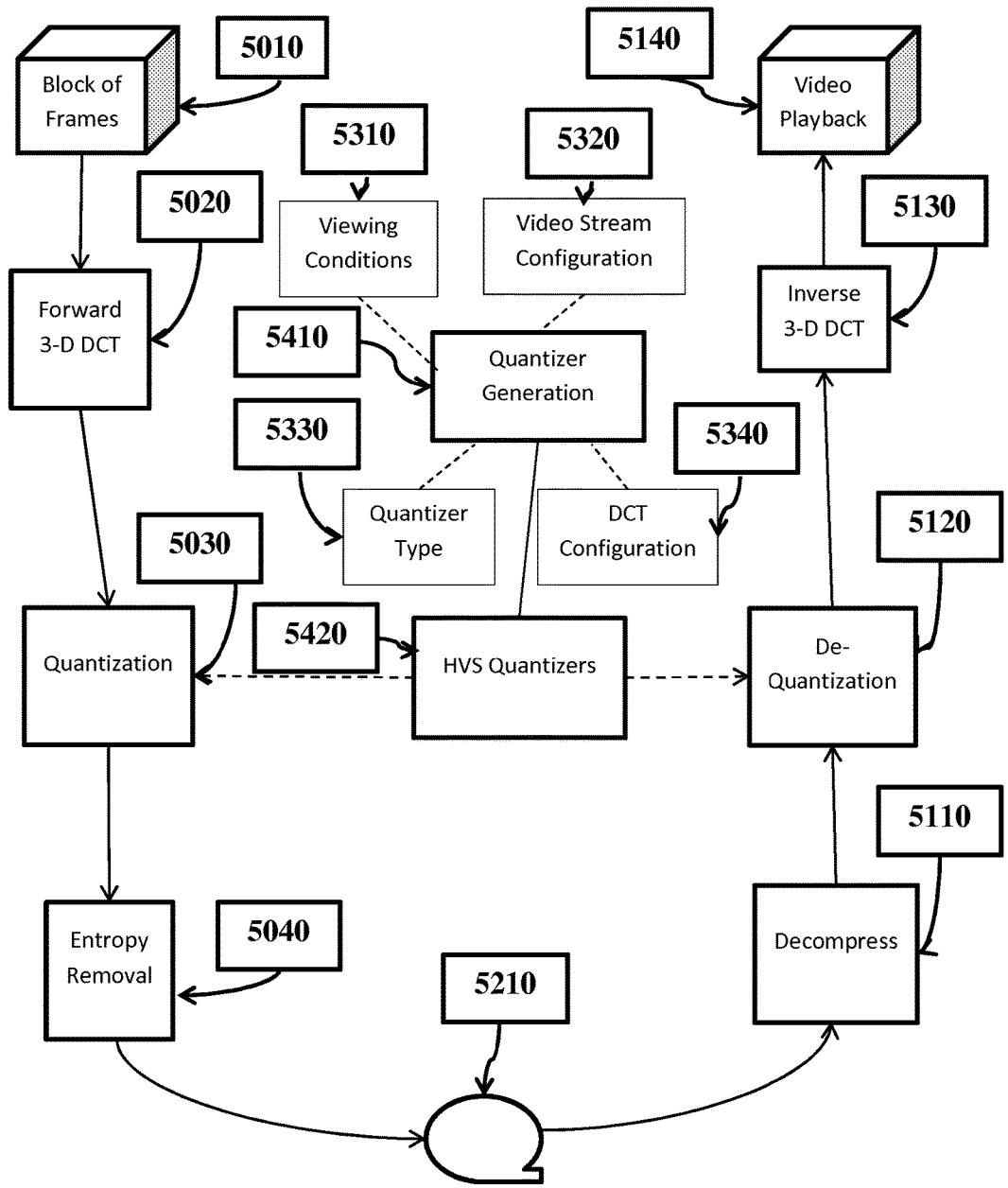
FIG. 5 depicts a compression system featuring an optimal time-varying transform using configuration parameters to independently generate visually optimal quantizers in compressor and decompressor.

As illustrated in FIG. 5, a block comprising a plurality of individual frames of digitized video 5010 is transformed via a three-dimensional DCT 5020 and then quantized 5030 to remove imperceptible visual data. An entropy removal process 5040 actually compresses the information. The decompression process follows an equivalent set of steps in reverse, when a data set or data stream containing the compressed data 5210 is decompressed 5110 by reversing said entropy removal process, followed by a de-quantization step 5120, an inverse DCT step 5130, and a resulting block of frames 5140 may be displayed or otherwise processed. Said quantizer process 5030 and said de-quantizer process 5120 use quantizers 5420 generated by a quantizer generation process 5410. Said quantizer generation process 5410 calculates said quantizers 5420 as a function of four sets of configuration data, the conditions under which viewing is expected to take place, and under which visual reconstruction will have no perceptual error 5310, the configuration of the video stream 5320, the quantizer generation algorithm to be used 5330, and the configuration of the applied decorrelating transform 5340.

Figure 6:
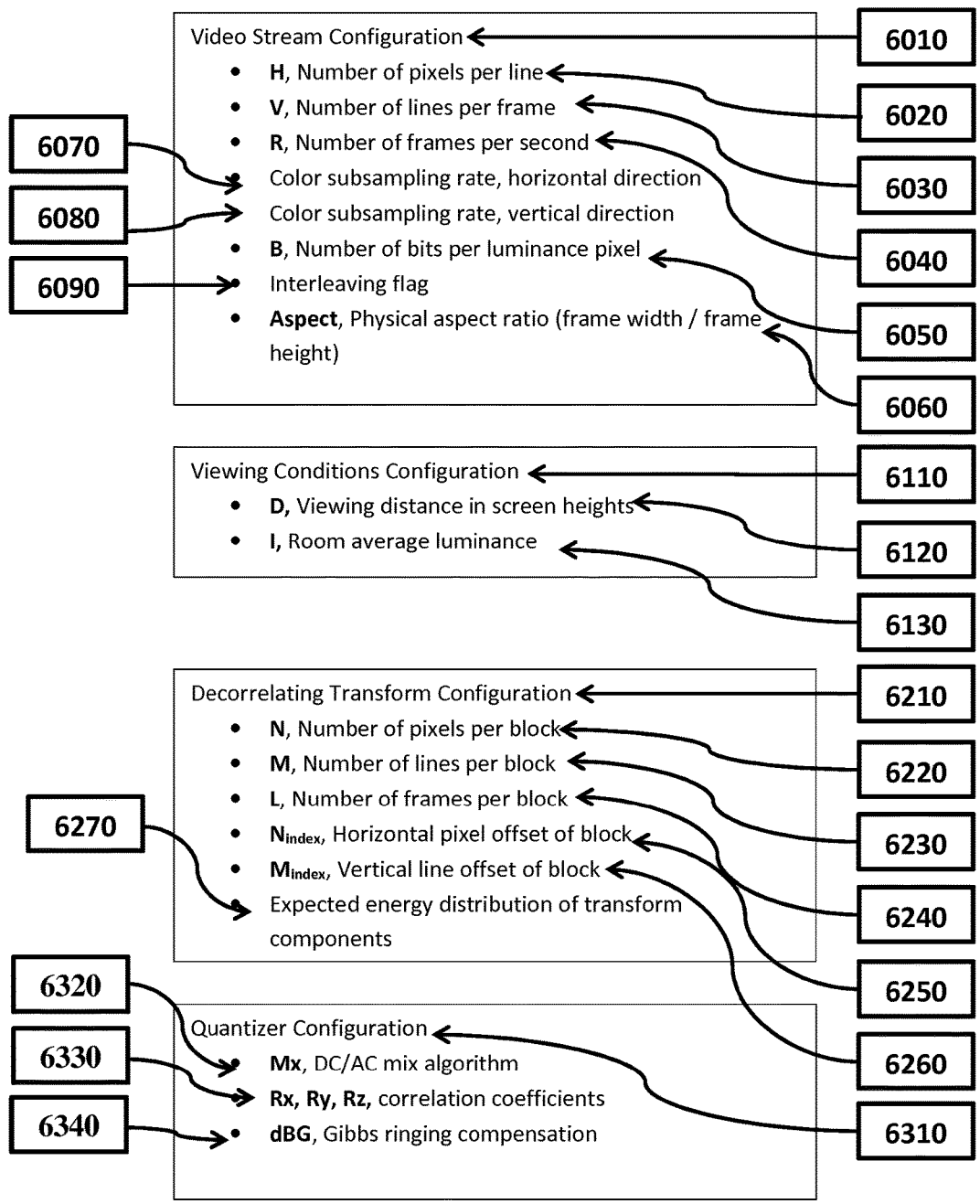
FIG. 6 describes a typical set of configuration parameters that may be used to generate visually optimal time-varying quantizers.

In the current embodiment, said configuration of video stream 5320 is elaborated in FIG. 6. Said configuration of video stream 6010 is comprised of individual configuration items H 6020, the number of pixels per line within the frame, V 6030, the number of lines within the frame, R 6040, the frame rate in frames per second, B 6050, the number of bits used to represent the luminance value per pixel, and Aspect 6060, the physical aspect ratio or ratio of physical frame width to physical frame height.

In the current embodiment, said configuration of viewing conditions 5310 is elaborated in FIG. 6. Said configuration of viewing conditions 6110 is comprised of individual configuration items D 6120, the expected viewing distance in screen heights, and I 6130, the expected average ambient luminance.

In the current embodiment, said configuration of block-based decorrelating transform 5340 is elaborated in FIG. 6. Said configuration of block-based decorrelating transform 6210 is comprised of individual configuration items N 6220, the number of pixels per transform block, M 6230, the number of lines per transform block, L 6240, the number of frames per transform block, Nindex 6250, the number of frames per transform block, and Mindex 6260, the number of frames per transform block.

In the current embodiment, said configuration of quantizer algorithm 5330 is elaborated in FIG. 6. Said configuration of quantizer algorithm 6310 is comprised of individual configuration items visual loss factor, 6320 Mx, mixed DC/AC coefficient algorithm, 6330 Rx, Ry and Rz, correlation in pixel, line and frame directions respectively, and 6340 dBG, Gibbs ringing compensation.

FIG. 7 defines a typical contrast sensitivity function 7010 CSF(u,w,l,X0,Xmax) in terms of said (6130) viewing conditions configuration item expected average ambient luminance l 7040, and additional variables u 7020, 2-dimensional spatial frequency, w 7030, temporal frequency, X0 7050, angle subtended by DCT block, and Xmax 7060, angle subtended by display surface.

Luminance quantizers are calculated as in FIG. 8(a). The equation 8010 calculates the quantizer Q 8020 for a particular decorrelating transform component of index n 8030 in the pixel direction, a particular decorrelating transform component of index m 8040 in the line direction and a particular decorrelating transform component of index l 8050 in the frame or time direction, a particular decorrelating transform component of position Mindex 8060 in the pixel direction and a particular decorrelating transform component of position Nindex 8070 in the line direction; given said two-dimensional spatial frequency u (7020), said temporal frequency w (7030), of said (6130) viewing conditions configuration item expected average ambient luminance l (7040), said angle subtended by DCT block X0 (7050), and said angle subtended by display surface Xmax (7060).

The equation 8110 of FIG. 8(b) calculates said temporal frequency of a transform component w (7030) as a function of said configuration of video stream configuration item frame rate in frames per second R (6040), said configuration of block-based decorrelating transform configuration item number of frames per transform block L (6240), and said particular decorrelating transform component of index in the frame or time direction l (8050).

The equation 9010 of FIG. 9(a) depicts a typical definition of said angle subtended by display surface Xmax (7060) in terms of said configuration of viewing conditions individual configuration item D the expected viewing distance in screen heights (6120). The equation 9020 of FIG. 9(b) depicts a typical definition of said angle subtended by DCT block X0 (7050) in terms of said configuration of block-based decorrelating transform individual configuration item the number of pixels per transform block N (6220) and said configuration of block-based decorrelating transform individual configuration item the number of lines per transform block M (6230).

Equation 10010 of FIG. 10 depicts a preferred process calculating said two-dimensional spatial frequency u (7020) given said particular decorrelating transform component of index in the pixel direction n (8030), said particular decorrelating transform component of index in the line direction m (8040), said particular decorrelating transform component of position in the pixel direction Mindex (8060) and a particular decorrelating transform component of position in the line direction Nindex (8070). A human visual system orientation response adjustment is rθ 10020. A human visual system ex-foveal eccentricity response adjustment is rθ 10030.

Figure 11:
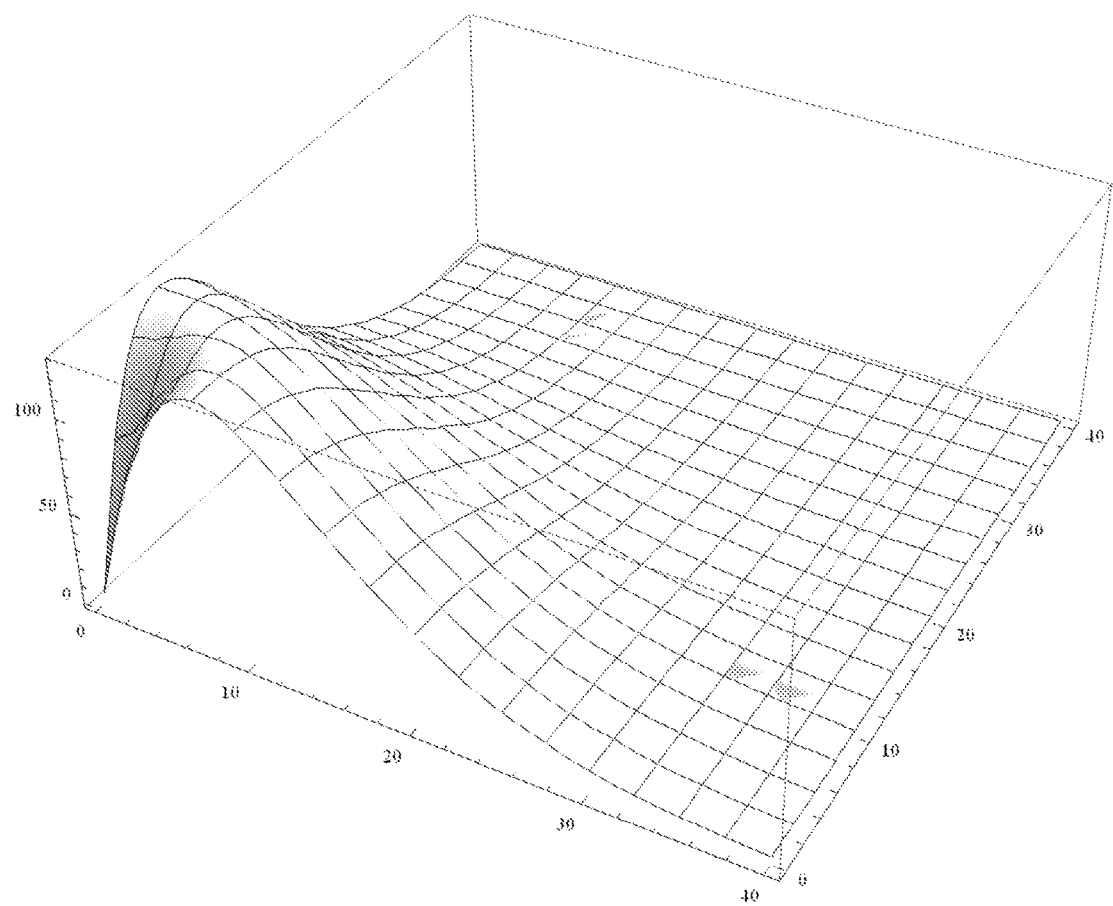
FIG. 11 depicts a typical symmetric contrast sensitivity function (without angular or off-axis corrections).
Figure 12:
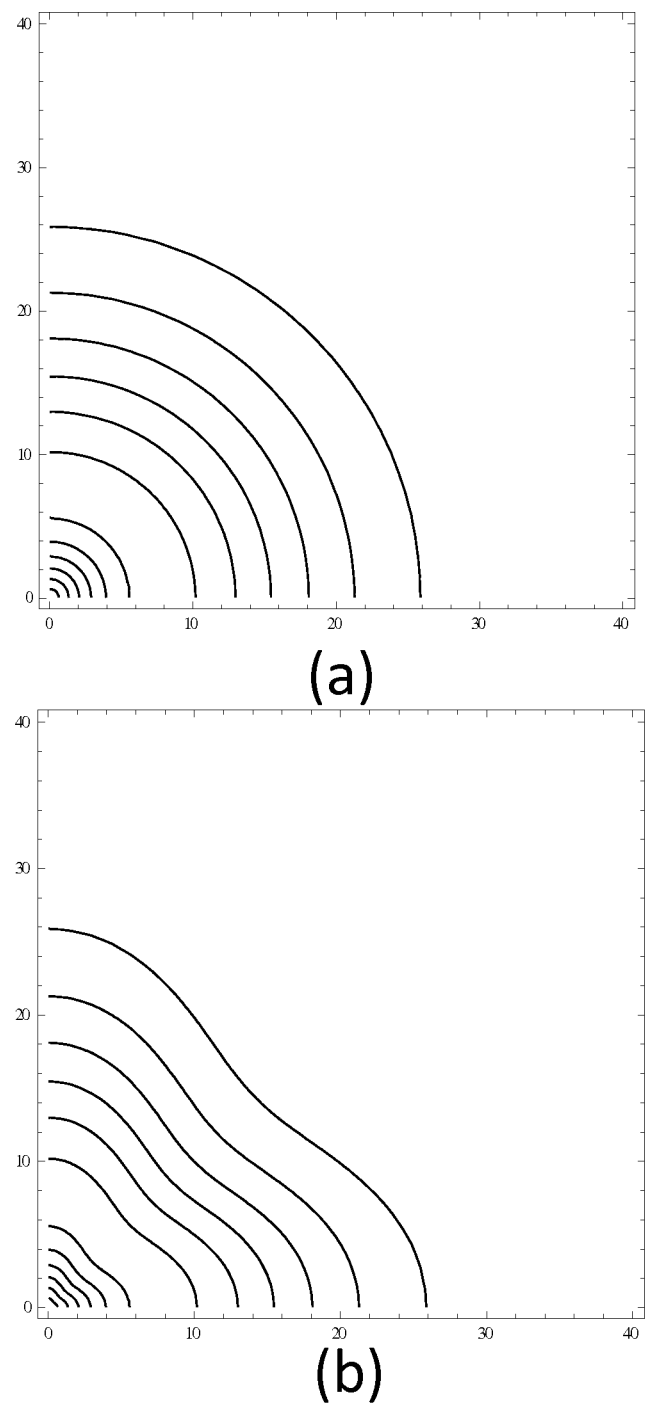
FIG. 12 depicts typical contrast sensitivity function off-axis visual sensitivity human visual system adjustments.
Figure 13:
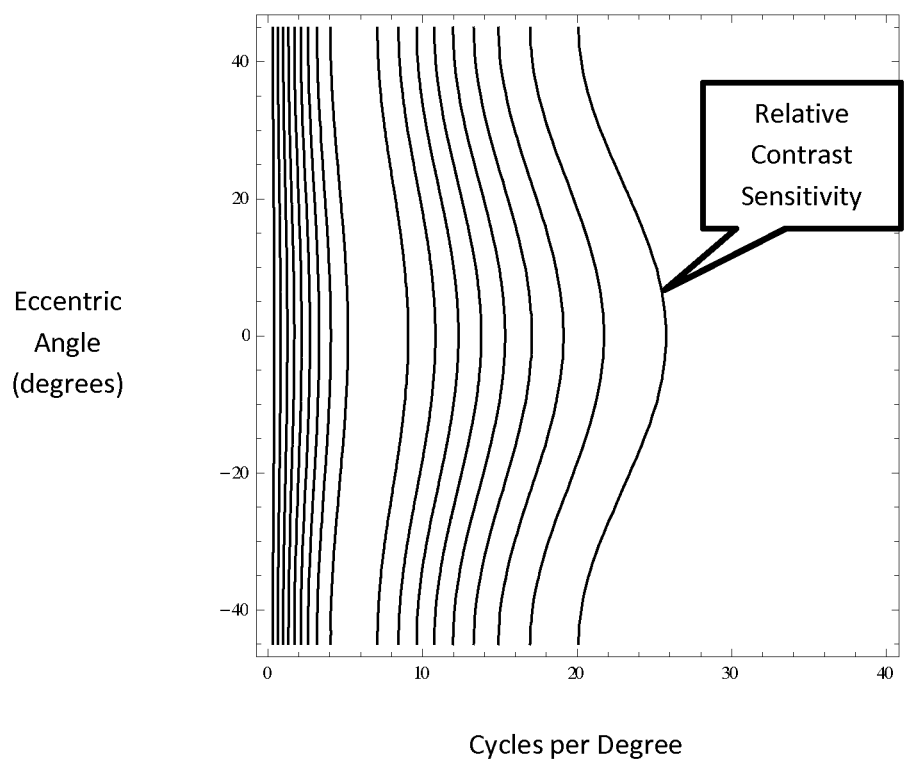
FIG. 13 depicts typical eccentric-angle visual sensitivity human visual system adjustments.

The two-dimensional map of values assumes by said typical contrast sensitivity function CSF(u,w,l,X0,Xmax) (7010) for equally-weighted is depicted in FIG. 11. The contour map of FIG. 12(a) further illustrates the symmetric distribution of said typical contrast sensitivity function CSF (u,w,l,X0,Xmax) (7010), while The contour map of FIG. 12(b) illustrates the application of said human visual system orientation response adjustment rθ (10020) to better model human visual orientation response. The contour map of FIG. 13 illustrates the application of said human visual system ex-foveal eccentricity response adjustment rθ (10030) to better model human visual off-axis response.

Figure 14:
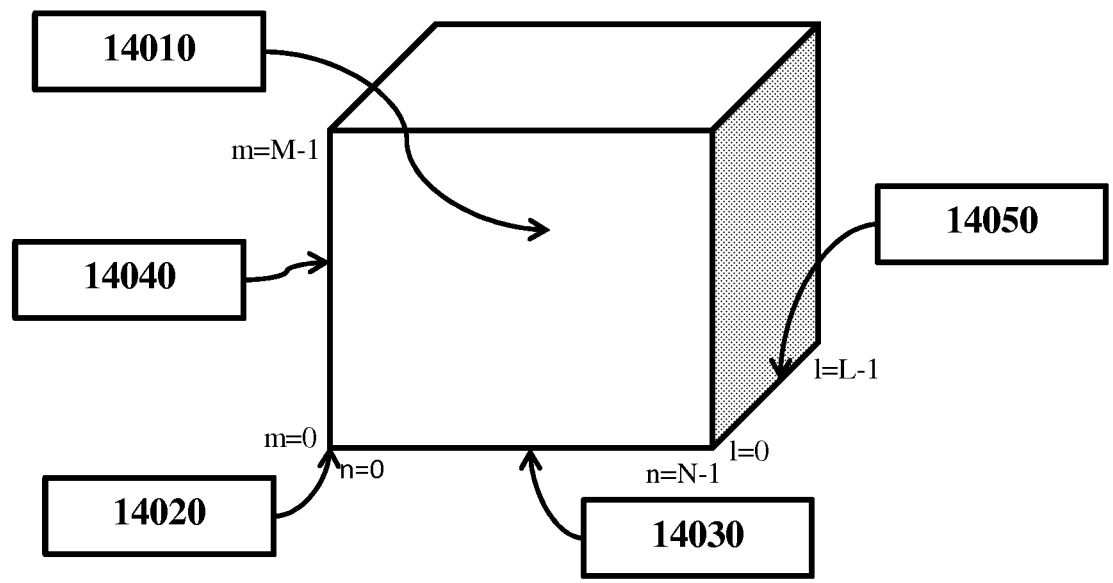
FIG. 14 depicts the location of DC, mixed DC/AC, and AC components within a 3-dimensional DCT block.

As illustrated in FIG. 14, said block 14010 transformed via a three-dimensional DCT (5020) is comprised a plurality of transform components. Transform component (n=0,m=0, l=0) 14020 is classified as pure DC. Transform components with (n=0) 14030, with (m=0) 14040, or with (l=0) 14050 are classified as mixed AC/DC. Component where no (l,m,n) is 0 are classified as pure AC components.

Said quantizer Q (8020) gives optimal response for pure AC transform components, but produces sub-optimal results for pure DC or mixed AC/DC components, due to the extreme sensitivity of the human eye to DC levels. Pure DC transform components may be quantized by the value that the variance of the DC component is concentrated over the number of possible levels that can be represented in the reconstructed image, as the human eye is constrained to the capabilities of the display. Equation 15010 of FIG. 15(a) defines the pure DC transform quantizer as a function of said configuration of block-based decorrelating transform individual configuration item the number of pixels per transform block N (6220), said configuration of block-based decorrelating transform individual configuration item number of lines per transform block M (6230), and said configuration of block-based decorrelating transform individual configuration item number of frames per transform block L (6240).

Mixed AC/DC components can be quantized by the minimum quantization step size apportioned over the variance of the DCT basis component. This process requires calculation of the per-component variance for the AC and DC components (i.e., the variance calculation in the number of dimensions in which each AC or DC component resides). Similarly, the value of the independent AC and DC quantizers must be calculated using the Contrast Sensitivity Function limited to the number of dimensions in which the AC or DC component resides. As illustrated in FIG. 15(b), the pseudocode C language program calcQ 15110 defines a quantizer suitable for application to the DC portion of mixed AC/DC components quantizer as a function of said configuration of block-based decorrelating transform individual configuration item the number of pixels per transform block N (6220), said configuration of block-based decorrelating transform individual configuration item number of lines per transform block M (6230), and said configuration of block-based decorrelating transform individual configuration item number of frames per transform block L (6240). Said typical AC/DC component with l=0 14050, the one-dimensional DC quantizer QDCm,n,0 15210 is calculated from said reduced-dimension calculation of the quantizer calcQ 15110.

The two-dimensional AC quantizer QACm,n,0 15220 is calculated directly from said typical generalized Contract Sensitivity Function CSF(u,w,l,X0,Xmax) 7010.

Figure 16:
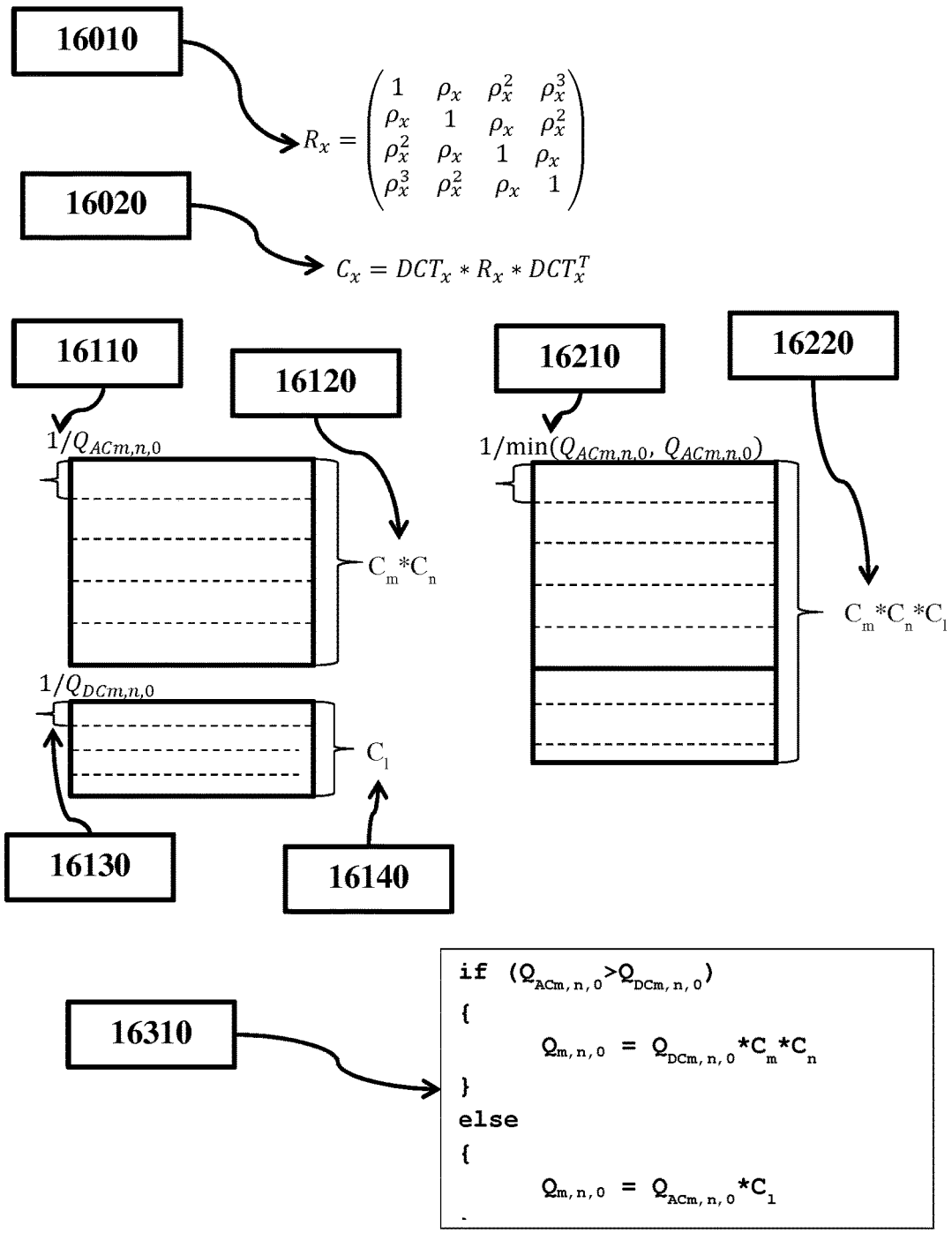
FIG. 16 illustrates the calculation of a statistically ideal mixed DC/AC quantizer.

FIG. 16 illustrates the process of deriving a statistically optimal quantizer Q m,n,0 16310 from said the one-dimensional DC quantizer QDCm,n,0 15210 and said two-dimensional AC quantizer QACm,n,0 15220. Said correlation coefficient 6330 Rx is used to generate an autocorrelation matrix Mx 16010. The convolution of said autocorrelation with the DCT in the x direction returns the variance-concentration matrix Cx 16020. Said process is understood to apply equally in the y and z directions.

The maximum visual delta of 1/QACm,n,0 16110 calculated to apply to the variance-concentrated range Cx[m,m]*Cy[n,n] 16120 and 1/QDCm,n,0 16130 calculated to apply to the variance-concentrated range Cz[0,0] 16130 is calculated as 1/min(QACm,n,0,QDCm,n,0) 16210, and can be applied over the entire range Cx[m,m]*Cy[n,n]*Cz[0,0] 16220.

Said statistically optimal quantizer Q m,n,0 16310 may now be calculated following with the C language pseudo-code excerpt 16320. It is to be understood that the process of calculating typical statistically ideal mixed AC/DC coefficients is illustrated in the general sense in FIG. 15 and FIG. 16, with minor changes to the procedure obvious to any experienced practitioner of the art.

The worst-case degradation in visual quality caused by the Gibbs phenomenon as a result of quantization is illustrated in FIG. 17*a*. A further adjustment to visual quality is supported by said Gibbs ringing adjustment 6340 dBG, which is interpreted (FIG. 17*b*) as illustrated in equation 17010 as a logarithmic factor of the actual reduction factor G 17020. Said dBG 6340 with a value of 0 represents said quantizer reduction factor G 17020 of 8.985%, which precisely removes the worst-case Gibbs ringing from having visible effect. Gibbs ringing removal is applied to said quantizers 5420 generated by said quantizer generation process 5410 as illustrated in equation 17110 by reduction in magnitude by the factor 1−G (one minus said factor G 17020).

What is claimed is:

1. A comprising:
   under control of one or more processors configured with executable instructions, providing improved visual quality for a given bitrate by:
   applying a decorrelating transform to time-varying visual data to generate decorrelating transform components;
   applying a spatiotemporal contrast sensitivity function to frequencies associated with the decorrelating transform components, the spatiotemporal contrast sensitivity function having a specified transformation block size;
   determining quantizers based at least in part on a result of the spatiotemporal contrast sensitivity function, the quantizers associated with the time-varying visual data and a physical size of the time-varying visual data, the quantizers having a specified frame rate, a specified angular size and a specified resolution;
   removing imperceptible visual data from the time-varying visual data based at least in part on the visual quantizers; and
   sharing the quantizers with a decompression system.

2. The method of claim 1, wherein the spatiotemporal contrast sensitivity function includes an oblique effect adjustment.

3. The method of claim 1, wherein the spatiotemporal contrast sensitivity function includes an off-axis eccentricity adjustment.

4. The method of claim 1, further comprising determining the specified angular size based at least in part on a specified viewing distance.

5. The method of claim 1, wherein the quantizers are determined based at least in part on a configuration of the time-varying visual data and a configuration of the decorrelating transform.

6. The method of claim 1, wherein decorrelating transform components include DC components.

7. The method of claim 6, wherein the visually quantizers includes a DC quantizer and a value of the DC quantizer is based at least in part on a concentration mass of the decorrelating transform.

8. The method of claim 1, wherein decorrelating transform components include an AC component, a DC component, and a mixed AC AND DC components.

9. The method of claim 8, wherein the quantizers includes a mixed AC AND DC quantizer and a value of the AC AND DC quantizer is a minimum of a value of the DC quantizer determined for the DC component and a value of an AC quantizer determined for the AC component.

10. The method of claim 8, wherein the quantizers includes a mixed AC AND DC quantizer and a value of the AC AND DC quantizer is an average of a value of the DC quantizer and a value of an AC quantizer, the value of the DC quantizer weighted by an expected variance of the DC component and the value of the AC quantizer weighted by an expected variance of the AC component.

11. The method of claim 1, further comprising reducing a value of the quantizes by a Gibbs ringing compensation factor, the Gibbs ringing compensation factor selected to remove a subjectively visible effect of a Gibbs phenomenon.

12. A method comprising:
   improving visual quality for a given bitrate by:
   determining an expected variance in individual dimensions associated with a AC component of a decorrelating transform;
   determining at least one AC quantizer associated with the AC component using a first contrast sensitivity function;
   weighting a value of the AC quantizer by the expected variance associated with an AC component;
   determining an expected variance in individual dimensions associated with a DC component;
   determining at least one DC quantizer associated with the DC component using a second contrast sensitivity function; and
   weighting a value of the DC quantizer by the expected variance associated with an DC component; and
   determining at least one quantizer suitable for application of a mixed AC AND DC component based on an average of the value of the AC quantizer and the value of the DC quantizer.

13. The method of claim 12, wherein the first contrast sensitivity function is a spatiotemporal contrast sensitivity function.

14. The method of claim 12, wherein the first contrast sensitivity function is a spatiotemporal contrast sensitivity function and includes an oblique effect adjustment.

15. The method of claim 12, wherein the first contrast sensitivity function is a spatiotemporal contrast sensitivity function and includes an off-axis eccentricity adjustment.

16. The method of claim 12, wherein the decorrelating transform is a block-based decorrelating transform having a specified block size.

17. The method of claim 12, wherein the first contrast sensitivity function is limited to a number of the dimensions associated with a AC component.

18. The method of claim 12, wherein the second contrast sensitivity function is limited to a number of the dimensions associated with a DC component.

19. The method of claim 12, wherein the first contrast sensitivity function is a generalized contract sensitivity function.

20. The method of claim 12, further comprising:
   receiving a plurality of individual frames of digitized video;
   applying a three-dimensional discrete cosine transform to the plurality of individual frames of the digitized video;
   quantizing the plurality of individual frames of the digitized video using at least one of the AC quantizer, the DC quantizer, and the mixed AC AND DC quantizer to remove imperceptible visual data from the plurality of individual frames;

removing entropy from the plurality of individual frames of the digitized video to compress the plurality of individual frames of the digitized video into a data stream; and sending the data stream to a decompressor.

21. A method comprising:

improving visual quality for a given bitrate by:

receiving time-varying visual data;

generating decorrelating transform components in response to the time-varying visual data;

applying a spatiotemporal contrast sensitivity function, the spatiotemporal contrast sensitivity function having a specified transformation block size, to frequencies associated with the decorrelating transform components using the specified transformation block size;

determining values of visual quantizers associated with the time-varying visual data based at least in part on the result of the spatiotemporal contrast sensitivity function and a configuration of the decorrelating transform; and removing imperceptible visual data from the time-varying visual data based at least in part on the visual quantizers.

22. The quantizer generation system of claim 21, wherein the spatiotemporal contrast sensitivity function includes an oblique effect adjustment.

23. The quantizer generation system of claim 21, wherein the spatiotemporal contrast sensitivity function includes an off-axis eccentricity adjustment.

24. The quantizer generation system of claim 21, further comprising determining the specified angular size based at least in part on a physical image size and a specified viewing distance.

25. The quantizer generation system of claim 21, wherein the visually quantizers have a specified frame rate, a specified angular size, and a specified resolution.

26. The quantizer generation system of claim 21, wherein the decorrelating transform is a Discrete Cosine Transform.

27. The quantizer generation system of claim 21, wherein the visually quantizer includes a DC quantizer and a value of the DC quantizer is based at least in part on a concentration mass of the decorrelating transform.

28. The quantizer generation system of claim 21, wherein:

the decorrelating transform components include DC components, AC components, and mixed AC AND DC components; and the visually quantizer includes a mixed AC AND DC quantizer and a value of the AC AND DC quantizer is a minimum of a value of the DC quantizer determined for the DC component and a value of an AC quantizer determined for the AC component.

29. The quantizer generation system of claim 21, wherein:

the decorrelating transform components include DC components, AC components, and mixed AC AND DC components; and the visually quantizer includes a mixed AC AND DC quantizer and a value of the AC AND DC quantizer is an average of a value of the DC quantizer and a value of an AC quantizer, the value of the DC quantizer weighted by an expected variance of the DC component and the value of the AC quantizer weighted by an expected variance of the AC component.

30. The quantizer generation system of claim 21, further comprising equally reducing a value of the visual quantizes by a Gibbs ringing compensation factor, the Gibbs ringing compensation factor selected to remove a subjectively visible effect of a Gibbs phenomenon.

* * * * *